United States Patent
Ngoc-Ai Lu

(10) Patent No.: US 10,397,000 B2
(45) Date of Patent: Aug. 27, 2019

(54) MULTI-LEVEL AUTHENTICATION FOR SECURE SUPPLY CHAIN ASSET MANAGEMENT

(71) Applicant: Raytheon Company, Waltham, MA (US)

(72) Inventor: Jessica Ngoc-Ai Lu, Chandler, AZ (US)

(73) Assignee: Raytheon Company, Waltham, MA (US)

( * ) Notice: Subject to any disclaimer, the term of this patent is extended or adjusted under 35 U.S.C. 154(b) by 130 days.

(21) Appl. No.: 15/676,094

(22) Filed: Aug. 14, 2017

(65) Prior Publication Data

US 2019/0052468 A1 Feb. 14, 2019

(51) Int. Cl.
*H04L 9/00* (2006.01)
*H04L 9/32* (2006.01)
(Continued)

(52) U.S. Cl.
CPC ............ *H04L 9/3247* (2013.01); *H04L 9/008* (2013.01); *H04L 9/0869* (2013.01);
(Continued)

(58) Field of Classification Search
CPC ... H04L 9/3226; H04L 9/3247; H04L 9/3252; H04L 9/3263
See application file for complete search history.

(56) References Cited

U.S. PATENT DOCUMENTS

| 8,478,196 B1 | 7/2013 | Hewinson |
| 8,750,514 B2 | 6/2014 | Gallo et al. |

(Continued)

FOREIGN PATENT DOCUMENTS

| CN | 102638446 | 8/2012 |
| EP | 2890172 | 7/2015 |
| WO | 2016/109835 A1 | 7/2016 |

OTHER PUBLICATIONS

International Search Report and Written Opinion for corresponding International Application No. PCT/US2018/029712 dated Jul. 11, 2018.
(Continued)

*Primary Examiner* — Beemnet W Dada
(74) *Attorney, Agent, or Firm* — Renner, Otto, Boisselle & Sklar, LLP

(57) ABSTRACT

An authentication system and method for authenticating an asset includes a Near Field Communication (NFC) tag associated with the asset, an NFC enabled user device, and an authentication server. The NFC tag includes a unique identifier and an encrypted output of a shared key that is stored on the authentication server. The encrypted output includes a Speck cryptographic algorithm. The unique identifier and the encrypted output are signed by an Elliptic Curve Digital Signal Algorithm (ECDSA) signature. When the user device verifies challenge/response messages and the unique identifier, and the ECDSA signature is verified by either the user device or the authentication server, the encrypted output is decrypted and the authentication server compares the decrypted data with the stored shared key to either determine that the asset is authentic or notify a stakeholder associated with the asset that the asset is inauthentic.

20 Claims, 6 Drawing Sheets

(51) Int. Cl.

| | |
|---|---|
| *H04L 29/06* | (2006.01) |
| *H04L 9/08* | (2006.01) |
| *H04L 9/30* | (2006.01) |
| *H04W 12/06* | (2009.01) |
| *H04W 4/80* | (2018.01) |
| *G06F 21/44* | (2013.01) |
| *H04W 12/00* | (2009.01) |

(52) U.S. Cl.
CPC .......... *H04L 9/3066* (2013.01); *H04L 9/3226* (2013.01); *H04L 9/3234* (2013.01); *H04L 9/3252* (2013.01); *H04L 9/3263* (2013.01); *H04L 9/3271* (2013.01); *H04L 63/0492* (2013.01); *H04L 63/08* (2013.01); *H04L 63/0823* (2013.01); *H04L 63/0884* (2013.01); *H04L 63/12* (2013.01); *H04W 4/80* (2018.02); *H04W 12/06* (2013.01); *G06F 21/44* (2013.01); *H04L 63/0435* (2013.01); *H04L 63/0876* (2013.01); *H04L 2209/805* (2013.01); *H04W 12/00407* (2019.01)

(56) References Cited

U.S. PATENT DOCUMENTS

| | | | |
|---|---|---|---|
| 8,750,793 | B2 | 6/2014 | Tysowski |
| 8,766,778 | B2 | 7/2014 | Brown |
| 8,990,960 | B2 | 3/2015 | Jussila |
| 9,059,857 | B2 | 6/2015 | Arunan et al. |
| 9,152,429 | B2 | 10/2015 | Li et al. |
| 9,208,293 | B1* | 12/2015 | Zhu ................ G06F 21/35 |
| 9,286,602 | B2 | 3/2016 | Rosati et al. |
| 9,300,473 | B2 | 3/2016 | Nix |
| 9,379,894 | B1 | 6/2016 | Luo et al. |
| 9,419,803 | B2 | 8/2016 | Teuwen |
| 9,571,164 | B1 | 2/2017 | Luo et al. |
| 2007/0038854 | A1 | 2/2007 | Cheon et al. |
| 2008/0177665 | A1 | 7/2008 | Noordam |
| 2009/0100267 | A1 | 4/2009 | Brown et al. |
| 2009/0303019 | A1 | 12/2009 | Trappeniers et al. |
| 2011/0022411 | A1 | 1/2011 | Hjelm et al. |
| 2011/0138192 | A1 | 6/2011 | Kocher et al. |
| 2011/0291803 | A1* | 12/2011 | Bajic ................ G08B 13/2462 340/10.1 |
| 2012/0094598 | A1 | 4/2012 | Tysowski |
| 2013/0222116 | A1 | 8/2013 | Barry, III |
| 2014/0330685 | A1 | 11/2014 | Nazzari |
| 2015/0363790 | A1 | 12/2015 | Collins et al. |
| 2016/0132704 | A1* | 5/2016 | Engels ................ H04W 4/80 340/10.42 |

OTHER PUBLICATIONS

Halliday, "What About the things", IEEE RFID 2016, May 5, 2015, pp. 1-34.

* cited by examiner

MULTI-LEVEL AUTHENTICATION FOR SECURE SUPPLY CHAIN ASSET MANAGEMENT

FIELD OF THE INVENTION

The invention relates to cryptography and more particularly to multi-level authentication.

DESCRIPTION OF THE RELATED ART

Various applications require verifying the authenticity of an article, such as a component or part, prior to use of the article. Particularly for safety and security purposes, authenticating the article ensures that the proper article is being provided for use in a particular application. In particular, authentication of an asset in a supply chain may be advantageous due to the travel of the asset from a supplier to a customer.

Near Field Communication (NFC) may be advantageous for use in authentication applications. NFC is a set of communication protocols for electronic devices that enables communication between the devices by bringing the devices together within a range of a few centimeters. NFC generally includes an initiator that generates a radio frequency field to power a passive target. The target generally includes a microchip that is capable of storing information for transfer to the initiator. The target may be associated with an asset for authentication of the asset. However, in a supply chain, the NFC standard may not ensure secure communication between the target of the asset and the initiator in that the NFC standard may not prevent various security attacks that may occur at some point along the supply chain. Examples of security attacks include man-in-the middle attacks, data masking, and data modification.

SUMMARY OF THE INVENTION

The present invention provides a secure data scheme for authenticating an asset by using the available memory in a Near Field Communication (NFC) tag associated with the asset. Data protection for the NFC tag is provided by using a light weight encrypted key having a Speck cryptographic algorithm (a Speck key) and an Elliptic Curve Digital Signature Algorithm (ECDSA) to sign the encrypted data and a unique identifier (UID) of the NFC tag. Challenge/response messages, the UID, and the ECDSA signature must be verified before the encrypted data is decrypted and compared with a stored copy of the data. After the decrypted data is determined to match the stored copy of the data, the asset is determined to be authentic. Authenticity, integrity, and confidentiality are achieved to detect a counterfeit or fraudulent asset, and to mitigate vulnerabilities in system-to-system data transfers between trusted devices.

According to an aspect of the invention, an authentication system for authenticating an asset includes a processing device that includes an NFC interface circuitry, a memory, and a processor coupled to the memory. The authentication system also includes an authentication server that is in communication with the processing device and has a copy of a shared key securely stored on the authentication server. The processing device is configured to establish an NFC connection with an NFC tag using the NFC circuitry and the NFC tag is associated with the asset and includes an encrypted output of the shared key that is signed by a digital signature using the NFC interface circuitry. The processing device may also be configured to verify the digital signature and forward the encrypted output from the NFC tag to the authentication server. The authentication server may also be configured to decrypt the encrypted output into decrypted content and verify the decrypted content with the shared key stored on the authentication server.

According to another aspect of the invention, the processing device may include a root certificate.

According to another aspect of the invention, the processing device may be configured to forward one or more messages between the NFC tag and the authentication server.

According to another aspect of the invention, one or more of the messages may include messages of a challenge/response authentication protocol performed between the NFC tag and the authentication server.

According to another aspect of the invention, the processing device may be an NFC enabled smart phone or tablet.

According to another aspect of the invention, the authentication system may further include a stake holder server in communication with the authentication server and the authentication server may be configured to send information to the stake holder server.

According to another aspect of the invention, the authentication system may be in combination with the NFC tag.

According to another aspect of the invention, the encrypted output may include a Speck cryptographic algorithm.

According to another aspect of the invention, the digital signature may include an Elliptical Curve Digital Signature Algorithm (ECDSA).

According to another aspect of the invention, the NFC tag may include a unique identifier and the processor may be configured to read and verify the unique identifier.

According to another aspect of the invention, the unique identifier may be a serial number.

According to another aspect of the invention, the encrypted output and the unique identifier may be signed with the digital signature.

According to an aspect of the invention, a method of authenticating an asset having an NFC tag includes storing a copy of a shared key on an authentication server and authenticating the NFC tag including reading the NFC tag and verifying a digital signature of the NFC tag that signs an encrypted output of the shared key. The method further includes authenticating the NFC tag using the authentication server which includes decrypting the encrypted output into decrypted data and comparing the decrypted data to the shared key stored on the authentication server.

According to another aspect of the invention, the method may include forwarding the encrypted output from the NFC tag to the authentication server using the NFC enabled user device.

According to another aspect of the invention, the method may include provisioning the NFC enabled user device by storing a root certificate in the NFC enabled user device.

According to another aspect of the invention, authenticating the NFC tag using the NFC enabled user device may include verifying a unique identifier associated with the NFC tag, the unique identifier being signed by the digital signature.

According to another aspect of the invention, authenticating the NFC tag using the NFC enabled user device may include forwarding at least one message of a challenge/response authentication protocol from the NFC tag to the authentication server.

According to another aspect of the invention, the method may include determining that the asset is authentic if the decrypted data and the shared key are equivalent or sending a notification to a stake holder server if the authentication server determines that the decrypted data and the shared key are not equivalent.

According to another aspect of the invention, the method may include provisioning the NFC tag using an authentication server including storing the copy of a shared key on the authentication server, programming the NFC tag with the encrypted output of the shared key, and signing the encrypted output with the digital signature.

According to another aspect of the invention, programming the NFC tag with the encrypted output may include using a Speck cryptographic algorithm and signing the encrypted output with the digital signature may include using an ECDSA.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles described herein have application for authenticating any suitable article in various applications. An example of a suitable application may be authenticating an asset in a supply chain.

Figure 1:
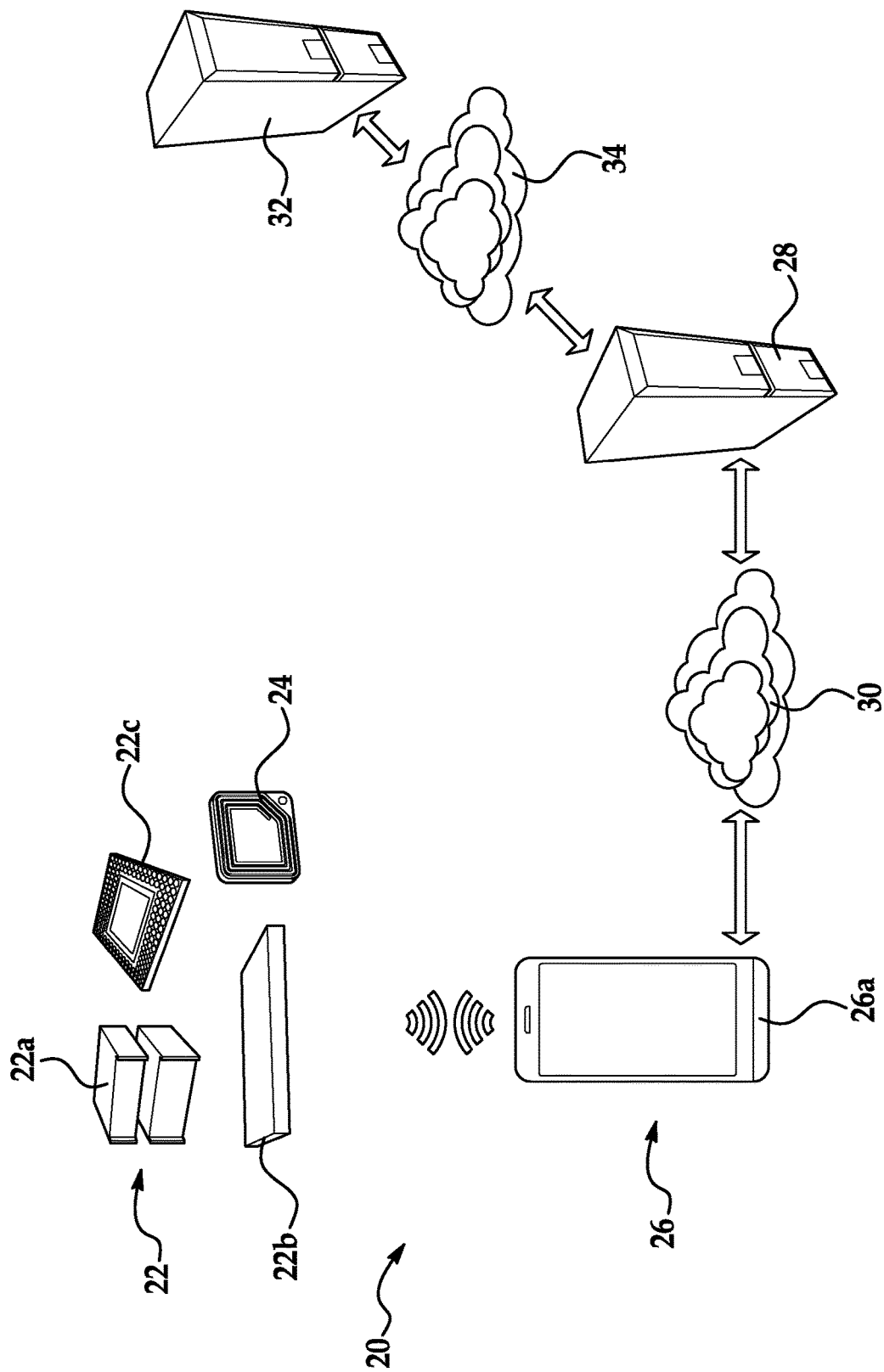
FIG. 1 is a schematic drawing showing an authentication system for authenticating an asset that includes an NFC tag, NFC enabled user device, and an authentication server.

Referring first to FIG. 1, a schematic drawing of an authentication system 20 is shown. The authentication system 20 may be used to authenticate an asset 22 having a Near Field Communication (NFC) tag 24. The NFC tag 24 may be a radio-frequency identification tag having a memory. The NFC tag 24 may be readable by an NFC tag reader and the NFC tag 24 may enable mutual authentication between the tag and the tag reader. The NFC tag 24 may be used with any asset or device having NFC capability and the device may be a standalone NFC device, a device with NFC circuitry contained within the device, or a device with removable NFC circuitry. The NFC tag 24 may be embedded within the device. Examples of suitable assets or devices include a radio 22a, a router or layer 2 encryptor 22b, and an Application Specific Integrated Circuit or a Field Programmable Gate Array 22c. There are many other suitable assets that may include an NFC tag 24 for identification and authentication using the authentication system 20. The NFC tag 24 may be in any suitable form, such as a card, sticker, key fob, or token. Using an NFC tag 24 is advantageous in that the NFC tag 24 may be implemented as a lightweight processing device and does not use a power source. The NFC tag 24 harvests power directly from the NFC electromagnetic field of the NFC reader.

The NFC reader may be part of an NFC enabled user device 26 of the authentication system 20. Any device that is capable of supporting NFC may be suitable for use. Examples of NFC enabled devices include a smartphone 26a or a tablet, but other communication devices may be suitable. The authentication system 20 may further include an authentication server 28 that is in communication with the user device 26. The authentication server 28 and the user device 26 may be in communication via a cloud network 30. The authentication system 20 may further include a second server 32 that is in communication with the authentication server 28 via a cloud network 34. The second server 32 may be a supply chain stake holder server such that the authentication server 28 may send a notification or information to the second server 32 if any of the information in the NFC tag 24 is found to be invalid by the authentication system 20.

Figure 2:
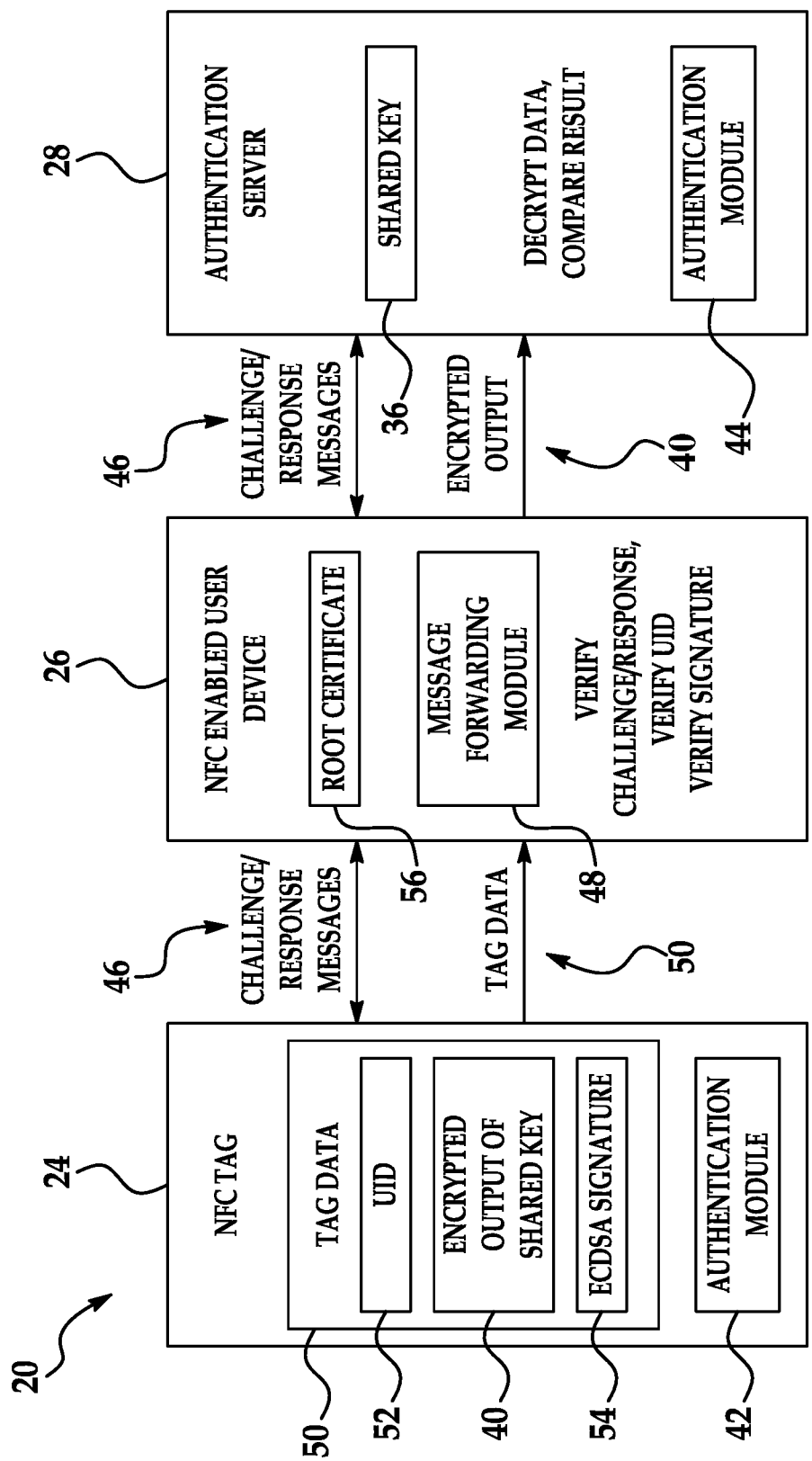
FIG. 2 is a block diagram of the authentication system of FIG. 1.

Referring now to FIG. 2, the authentication server 28 may include a copy of a shared key 36. The shared key 36 may be stored within a memory of the authentication server 28. The authentication system 20 may also be configured to interact with an asset database that may be stored on the authentication server 28 or securely accessed by the authentication server 28. The asset data base will include a plurality of unique shared keys or shared secrets that are associated with provisioned assets and corresponding NFC tags 24. The NFC tag 24 may be pre-provisioned or programmed to include an encrypted output 40 of the shared key 36. The shared key 36 may be encrypted using a Speck cryptographic algorithm or any other suitable cryptographic algorithm. Using the Speck cryptographic algorithm may be advantageous in that the Speck algorithm is lightweight and a relatively fast cipher. The Speck algorithm is a block cipher family having ten distinct block ciphers with different block and key sizes that may be selected to closely fit application requirements. The cipher may have key sizes of 64, 72, 96, 128, 144, 192, or 256 bits and block sizes of 32, 48, 64, 96, or 128 bits. The structure of the Speck cipher is an add-rotate-xor such that the cipher has a round function that includes two rotations, adding the right word to the left word, xoring the key into the left word, and xoring the left word to the right word. The Speck cipher may include 22 to 34 rounds depending on the block and key size. Any suitable block and key size may be used.

The encrypted output 40 of the shared key 36 (Speck key) may be stored within a memory of the NFC tag 24. A plurality of shared keys or encrypted outputs may be used. Each of the NFC tag 24 and the authentication server 28 includes an authentication module 42, 44. The authentication modules 42, 44 may include hardware, software or a combination of hardware and software for carrying out a challenge/response authentication protocol 46. The user device 26 may include a message forwarding module 48 that includes hardware, software or a combination of hardware and software for forwarding the challenge/response messages from the NFC tag 24 to the authentication server 28 and executing the challenge/response authentication protocol 46. The challenge/response messages may be generated using a cryptographic secure pseudorandom number generator and a cryptographic hash function to ensure that each challenge/response sequence is unique. The hash function operates using a UID and a random challenge value to create a response value. In alternative embodiments, the authentication system 20 may include a plurality of authentication servers or the authentication server 28 may be configured to communicate with a plurality of user devices or NFC tags.

Tag data 50 of the NFC tag 24 may include the encrypted output 40 of the shared key 36 and a unique identifier (UID) 52 or a serial number. The UID 52 may be read by the user device 26 and verified by the user device such that the user device 26 may be used to verify both the challenge/response messages 46 and the UID 52. The tag data 50 may further include asymmetric-key or public-key encryption, such as a digital signature 54 for signing the UID 52 and the encrypted output 40 of the shared key 36. Using the digital signature 54 may be advantageous in providing data integrity, data origin authentication, and non-repudiation. The digital signature 54 may be in the form of a Digital Signature Algorithm (DSA) and more specifically, an Elliptic Curve Digital Signature Algorithm (ECDSA) which is an elliptic curve analogue of the DSA. The user device 26 or the authentication server 28 may be used to verify the digital signature 54. The authentication server 28 may contain the private ECDSA key and the Speck key.

Using the ECDSA may be advantageous in that the ECDSA may enable cryptographic strength while also being a shorter signature as compared with an integer-based digital signature. The shorter signature may be faster, more cost effective, and implemented in computationally-restricted devices. Generally, the signature is generated by first determining the field and equation of the curve, a base point G of prime order on the curve, and a multiplicative order n of the base point. The ECSDA signature 54 is signed using an ECSDA private key. The authentication server 28 may contain the private ECDSA key and the Speck key. Generally, signing a message (m) may include the steps of:

1) calculating e=HASH(m), with HASH being a cryptographic hash function such as SHA-2
2) calculating $z=L_n$, with $L_n$ being the leftmost bits of e and the bit length of the group order n
3) selecting a cryptographically secure random integer k from an interval [1, n−1]
4) calculating a curve point $(x_1, y_1)$=k×G
5) calculating r=$x_1$ mod n. If r=0, then step 3) is repeated.
6) calculating s=$k^{-1}(z+rd_A)$ mod n. If s=0, then step 3) is repeated.
7) determining the signature by the pair (r, s)

The pair (r, s) may include two numbers r, s such that the signature includes two numbers. Any suitable ECDSA curve may be used. For example, a random elliptic curve over a prime field may be used. A suitable random curve may be an ECDSA P-256 curve, meaning that the order of the prime field may be equal to $2^{256}-2^{224}+2^{192}+296-1$. The ECDSA P-256 algorithm may be in a machine-to-machine (M2M) public key certificate format. The M2M format is a subset of an X.509-based public key infrastructure. The M2M format may be advantageous for use with limited memory such as in the NFC tag 24.

The user device 26 may be loaded with a public key certificate or a root certificate 56 for verifying the ECDSA signature 54. The root certificate 56 may be an ECDSA trust anchor or an M2M certificate. The root certificate 56 includes the ECDSA public key which is derived from private key and domain parameters. The root certificate 56 may be self-signed and form the basis of an X.509-based public key infrastructure. When the user device 26 has verified the challenge/response messages, UID 52, and the ECDSA signature 54, the user device 26 may be configured to send the encrypted output 40 of the shared key 36 to the authentication server 28. The authentication server 28 may be configured to decrypt the encrypted data and compare the result with the shared key 36 stored in the authentication server 28. The authentication server 28 contains a Speck key that is used to encrypt the shared secret programmed into the NFC tag 24. The Speck decryption uses the inverse of the round functions of the cipher.

In another contemplated embodiment, the user device 26 may verify the challenge/response messages and the UID 52. The user device 26 may then forward the data of the NFC tag 24 to the authentication server 28 and the authentication server 28 may verify the digital signature 54, decrypt the encrypted data and compare the decrypted content with the shared key 36.

Figure 3:
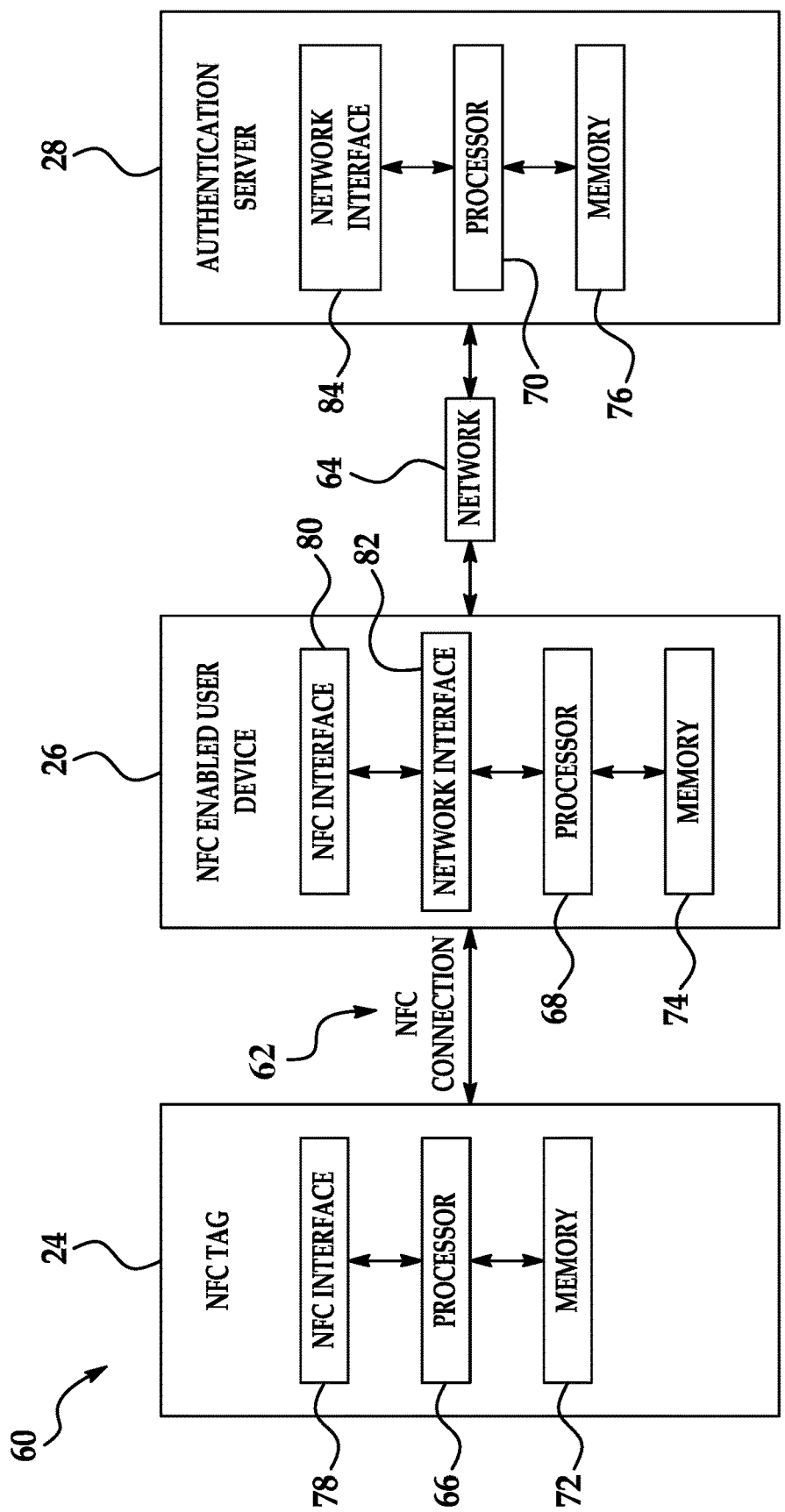
FIG. 3 is a block diagram showing a communication system of the authentication system shown in FIGS. 1 and 2.

FIG. 3 is block diagram showing a communication system 60 for the authentication system 20. The user device 26 may be connected to the NFC tag 24 using an NFC connection 62. The authentication server 28 and the user device 26 may be connected over a network 64. The NFC tag 24, the user device 26, and the authentication server 28 may include processors 66, 68, 70 coupled to memories 72, 74, 76. Each of the processors 66, 68, 70 may include a microprocessor, a microcontroller, an application-specific integrated circuit, a field-programmable gate array or any other type of suitable processing circuitry. Each of the memories 72, 74, 76 may include random access memory, read-only memory or any other types of memory. The NFC tag 24 and the user device 26 may include NFC interfaces 78, 80 that permit the user device 26 and the NFC tag 24 to establish the NFC connection 62.

The user device 26 and the authentication server 28 may include network interfaces 82, 84 that allow the authentication server 28 and the user device 26 to communicate over the network 64. The network interfaces 82, 84 may include one or more transceivers. The network interface 82 of the user device 26 may also be configured to communicate with other NFC enabled user devices over the network 64. The network 64 may include a global computer network such as the internet, a wide area network, a local area network, a satellite network, a wireless network, or any other suitable network.

Figure 4:
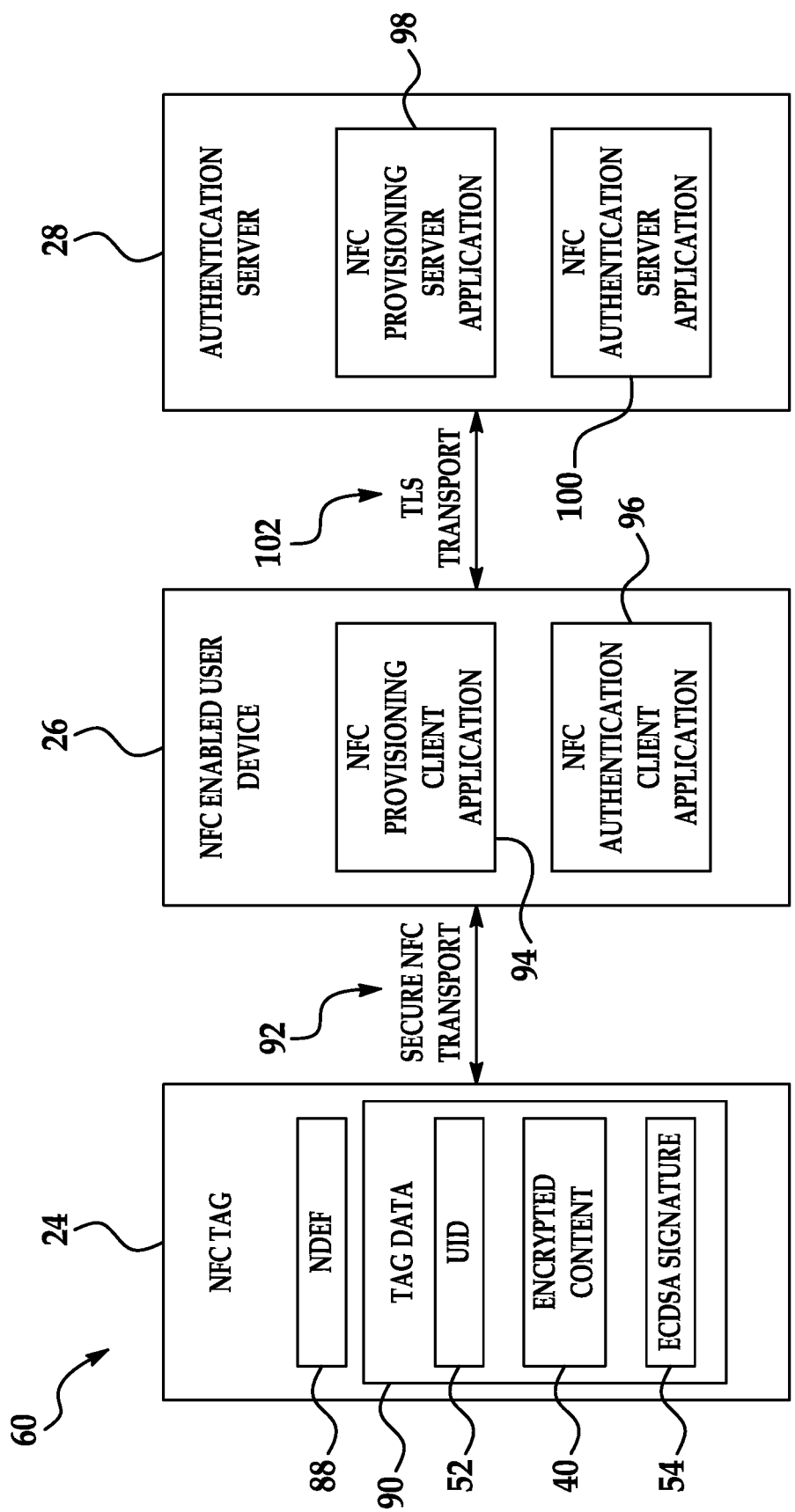
FIG. 4 is a block diagram showing applications associated with the NFC enabled user device and the authentication server of FIGS. 1-3.

Referring now to FIG. 4, the provisioned NFC tag 24 of the communication system 60 may include a standardized data format used to exchange information with the user device 26. The standardized data format may be a binary message format or an NFC Data Exchange Format (NDEF) 88. The NDEF 88 may exchange application-defined payloads with the user device 26 or store payloads on the NFC tag 24. The payload may be described by a type, length, and identifier encoded in an NDEF record structure. The payload 90 of the NFC tag 24 may include the UID 52, encrypted output 40 of the shared key, and the ECDSA signature 54. The payload 90 may further be used for the challenge/response message protocol 46 (shown in FIG. 2) and key splitting. In an exemplary embodiment, the UID 52 may be an 8-byte number, the ECDSA signature 54 may use 32 bytes, the key splitting may use 16 bytes, and the challenge/response message protocol 46 may use 4 bytes. The encrypted output 40 may vary in size depending on the memory available on the NFC tag 24. Many configurations of the payload 90 may be suitable and the NDEF 88 may be used to ensure secure NFC transport 92 between the NFC tag 24 and the user device 26.

The user device 26 may include an NFC provisioning client application 94 and an NFC authentication client application 96. The provisioning client application 94 may be used to load the root certificate 56 (shown in FIG. 3) into the memory area 74 (shown in FIG. 3) of the user device 26. The authentication client application 96 may be used to read the payload 90 (shown in FIG. 4) of the NFC tag 24 and verify the ECDSA signature 54 of the data stored in the NFC tag 24. The authentication client application 96 may be used to forward the payload 90 or the encrypted output 40 to the authentication server 28. The authentication server 28 may include an NFC provisioning server application 98 and an NFC authentication server application 100. The NFC provisioning server application 98 may be used to program or provision the NFC tag 24 and the authentication server application 100 may be used to decrypt the encrypted output 40 and compare the result with the shared copy of the key 36 (shown in FIG. 2) stored on the authentication server 28. The NFC provisioning server application 98 may have access to the ECDSA private key to ECDSA sign the NFC tag 24. The applications of the user device 26 and the authentication server 28 may be in communication via a Transport Layer Security (TLS) protocol 102 that provides privacy and data integrity between the communicating applications. Client-server applications generally use the TLS protocol to communication across a network in a secure manner, such that eavesdropping is prevented. Any suitable TLS protocol may be used, such as a TLS 1.2 protocol.

Figure 5:
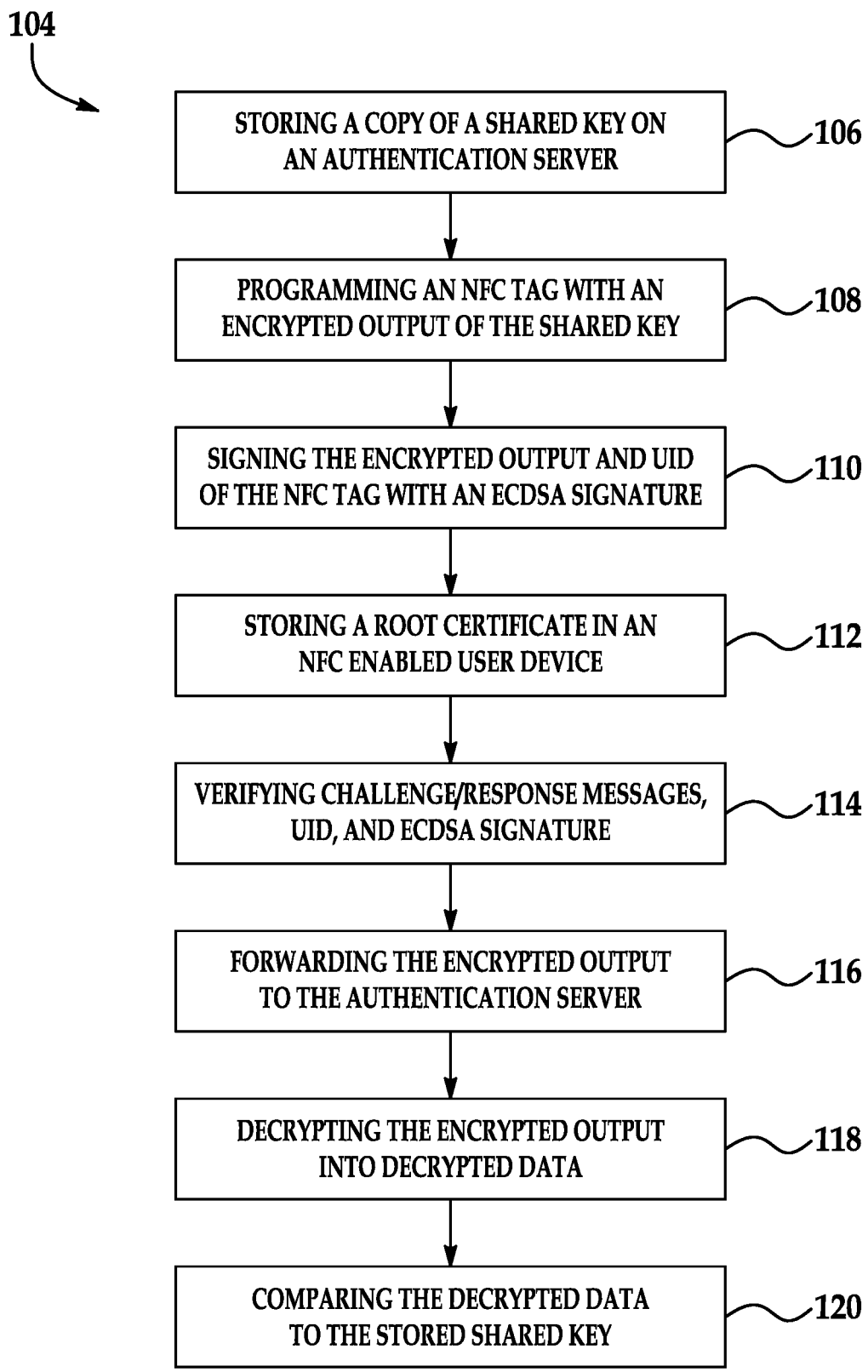
FIG. 5 is a flow chart showing a method for authenticating an asset using the authentication system of FIGS. 1-4.

Referring now to FIG. 5, a method 104 of authenticating the asset 22 (shown in FIG. 1) using the user device 26 (shown in FIGS. 1-4) and the NFC tag 24 (shown in FIGS. 1-4) embedded to the asset 22 is shown. The method 104 may include provisioning the NFC tag 24 using the authentication server 28 (shown in FIGS. 1-4). Provisioning the NFC tag 24 may include step 106, step 108, and step 110 of the method 104. Step 106 may include storing a copy of the shared key 36 (shown in FIG. 2) on the authentication server 28. Step 108 may include programming the NFC tag 24 with the encrypted output 40 (shown in FIGS. 2 and 4) of the shared key 36 and step 110 may include signing the encrypted output 40 with the DSA signature. In embodiments, step 110 may include signing the encrypted output 40 with the ECDSA signature 54 (shown in FIGS. 2 and 4). Signing the encrypted output 40 includes computing the ECDSA signature 54 using the private key over the block of data, i.e. the message (m) as previously described. The NFC provisioning server application 98 (shown in FIG. 4) may be used to provision the NFC tag 24. Programming the NFC tag 24 with the encrypted output 40 may include the Speck cryptographic algorithm. Signing the encrypted output 40 may include using the ECDSA signature 54. Step 110 may also include signing the UID 52 (shown in FIGS. 2 and 4) using the ECDSA signature 54.

The method 104 may include provisioning the user device 26 using the NFC provisioning client application 94 (shown in FIG. 4). Provisioning the user device 26 may include step 112 which may include storing the root certificate 56 (shown in FIG. 2) in the user device 26. The method 104 may further include authenticating the NFC tag 24 using the user device 26 which may include reading the NFC tag 24 and step 114 of the method. The NFC authentication client application 96 (shown in FIG. 4) may be used to authenticate the NFC tag 24. Step 114 may include verifying the challenge/response messages 46 (shown in FIG. 2), verifying the UID 52 after the challenge/response messages 46 have been verified, and verifying the ECDSA signature 54 after the UID 52 has been verified.

After the challenge/response messages 46, the UID 52, and the ECDSA signature 54 have been verified by the user device 26, step 116 of the method 104 may include forwarding the encrypted output 40 from the NFC tag 24 to the authentication server 28 using the user device 26. After the encrypted output 40 is forwarded to the authentication server 28, step 116 of the method may include authenticating the NFC tag 24 using the authentication server 28 which may include steps 118 and 120. The NFC authentication server application 100 (shown in FIG. 4) may be used to authenticate the NFC tag 24. Step 118 may include reconstructing the encrypted output 40 or decrypting the encrypted output 40 into decrypted data. Reconstructing the encrypted output 40 may include extracting the shared data from the forwarded encrypted data by first decrypting the forward encrypted data. Step 120 may include comparing the decrypted data to the shared key 36 stored on the authentication server 28.

Figure 6:
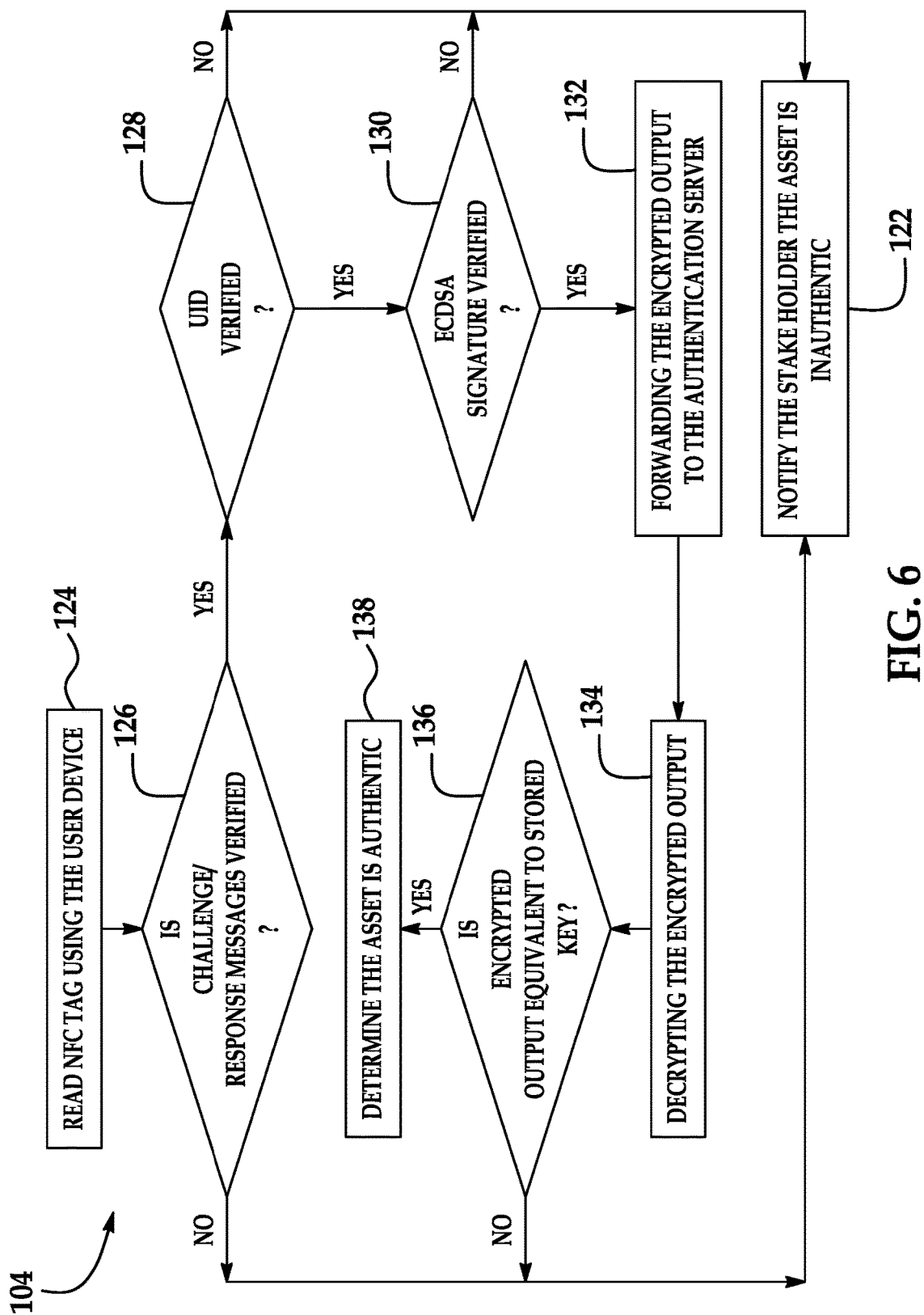
FIG. 6 is a flow chart showing the method of FIG. 5 including the step of notifying a stake holder associated with the asset if the asset is determined to be inauthentic.

Referring in addition to FIG. 6, the method 104 may include step 122 of notifying a stake holder associated with the asset 22 if the asset 22 is inauthentic. A stake holder may include a company that owns the asset or assets 22. The stake holder may be registered with the authentication system to be notified. Any suitable notification may be used. Examples of types of notification that may be used include text messages, emails, or other reporting methods. Notifying the stake holder may include using the authentication server 28 to send information to the second server 32 (shown in FIG. 1) that is associated with the stake holder. Information that may be sent between the servers 28, 32 may include any information associated with the asset 22 such as the NFC tag UID 52, or a location of the asset 22.

The method 104 may include step 124 which includes reading the NFC tag 24 using the user device 26. Step 126 may include verifying the challenge/response messages 46. Step 122 will be executed if the challenge/response messages 46 are not verified by the user device 26 and step 128 will be executed if the challenge/response messages 46 are verified. Step 128 may include verifying the UID 52 and step 122 will be executed if the UID 52 is not verified by the user device 26. Step 130 will be executed if the UID 52 is verified and step 130 may include verifying the ECDSA signature 54. Step 122 will be executed if the ECDSA signature 54 is verified and steps 132 and 134 will be executed if the ECDSA signature 54 is verified. If the asset 22 is determined to be inauthentic, the authentication system 20 may be updated to indicate that the authentication system 20 is in a compromised state.

Step 132 may include forwarding the encrypted output 40 to the authentication server 28 and step 138 may include decrypting the encrypted output 134. After the encrypted output 134 has been decrypted, step 136 may include comparing the decrypted data to the shared key 36 stored on the authentication server 28 and determining if the decrypted data is equivalent to the shared key 36 to validate the NFC tag 24. Step 122 may be executed if the authentication server 28 determines that the decrypted data is not equivalent to the shared key 36. If the authentication server 28 determines that the decrypted data is equivalent to the shared key 36, step 138 may be executed which includes the authentication server 28 determining that the asset 22 is authentic. The authentication server 28 may provide any suitable output that indicates to a user that the asset 22 is authentic. Using the authentication system and method is advantageous in that the system provides multiple levels of authentications or verifications using applications of the user device and the authentication server.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An authentication system for authenticating an asset, the authentication system comprising:
    a processing device comprising:
        a Near Field Communication (NFC) interface circuitry;
        a memory; and
        a processor coupled to the memory; and
    an authentication server that is in communication with the processing device, the authentication server having a copy of a shared key stored on the authentication server;
    wherein the processing device is configured to:
        establish an NFC connection with an NFC tag using the NFC circuitry, the NFC tag being associated with the asset and including tag data that includes an encrypted output of the shared key that is signed by a digital signature using the NFC interface circuitry;
        read and verify at least one item of the tag data of the NFC tag; and
        forward the encrypted output from the NFC tag to the authentication server only if the tag data other than the encrypted output is first verified;
    wherein either the processing device or the authentication server is configured to verify the digital signature; and
    wherein the authentication server is configured to:
        decrypt the encrypted output into decrypted content; and
        verify the decrypted content with the shared key stored on the authentication server.

2. The authentication system of claim 1, wherein the processing device includes a root certificate for verifying the digital signature.

3. The authentication system of claim 1, wherein the processing device is configured to forward one or more messages between the NFC tag and the authentication server.

4. The authentication system of claim 3, wherein one or more of the messages includes messages of a challenge/response authentication protocol performed between the NFC tag and the authentication server.

5. The authentication system of claim 1, wherein the processing device is an NFC enabled smart phone or tablet.

6. The authentication of claim 1 further comprising a stake holder server in communication with the authentication server and the authentication server may be configured to send information to the stake holder server.

7. The authentication system of claim 1 in combination with the NFC tag.

8. The authentication system of claim 7, wherein the encrypted output includes a Speck cryptographic algorithm.

9. The authentication system of claim 7, wherein the digital signature includes an Elliptic Curve DSA (ECDSA).

10. The authentication system of claim 7, wherein the NFC tag further includes a unique identifier and the processor is configured to read and verify the unique identifier.

11. The authentication system of claim 10, wherein the unique identifier is a serial number.

12. The authentication system of claim 10, wherein the encrypted output and the unique identifier are signed with the digital signature.

13. A method of authenticating an asset having a Near Field Communication (NFC) tag, the method comprising:
    storing a copy of a shared key on an authentication server;
    authenticating the NFC tag using an NFC enabled user device including:
        reading the NFC tag including reading tag data; and
        verifying a digital signature of the NFC tag that signs an encrypted output of the shared key and at least one other item of the tag data; and
    authenticating the NFC tag using the authentication server including:
        decrypting the encrypted output into decrypted data only if the digital signature and the tag data other than the encrypted output is first verified; and
        comparing the decrypted data to the shared key stored on the authentication server.

14. The method of claim 13 further comprising forwarding the encrypted output from the NFC tag to the authentication server using the NFC enabled user device.

15. The method of claim 13 further comprising provisioning the NFC enabled user device by storing a root certificate in the NFC enabled user device.

16. The method of claim 13, wherein authenticating the NFC tag using the NFC enabled user device includes verifying a unique identifier associated with the NFC tag, the unique identifier being signed by the digital signature.

17. The method of claim 13, wherein authenticating the NFC tag using the NFC enabled user device includes forwarding at least one message of a challenge/response authentication protocol from the NFC tag to the authentication server.

18. The method of claim 13 further comprising:
    determining that the asset is authentic if the decrypted data and the shared key are equivalent; or
    sending a notification to a stake holder server if the authentication server determines that the decrypted data and the shared key are not equivalent.

19. The method of claim 12 further comprising:
    provisioning the NFC tag using an authentication server including:
    storing the copy of a shared key on the authentication server;
    programming the NFC tag with the encrypted output of the shared key; and
    signing the encrypted output with the digital signature.

20. The method of claim 19, wherein programming the NFC tag with the encrypted output includes using a Speck cryptographic algorithm and signing the encrypted output with the digital signature includes using an ECDSA.

* * * * *